United States Patent Office 3,128,319
Patented Apr. 7, 1964

3,128,319
ISOMERIZATION OF NORMAL BUTANE
Erwin E. Meisinger, Elmhurst, and Richard S. Corey, Rolling Meadows, Ill., assignors to Universal Oil Products Company, Des Plaines, Ill., a corporation of Delaware
No Drawing. Filed Mar. 13, 1963, Ser. No. 264,780
7 Claims. (Cl. 260—683.65)

This invention relates to the isomerization of normal butane and is more particularly concerned with a novel catalytic composition which is utilized to effect the desired isomerization.

In recent years with the advance of the automotive industry and the aviation industry, fuels of relatively high anti-knock rating have been found necessary. Many methods have been provided for producing the desired high anti-knock fuels. These methods include such processes as alkylation, catalytic reforming, catalytic cracking and high temperature thermal cracking and thermal reforming operations. Other processes which may be considered in a sense auxiliary were developed as, for example, isomerization which was employed to produce isoparaffins which subsequently were reacted with olefins to form a high octane number motor fuel fraction, commonly termed alkylate. In addition to the production of one of the reactants for alkylation, isomerization was also utilized to increase the anti-knock quality of saturated hydrocarbons such as paraffins and naphthenes found in selected fractions of gasolines and naphthas. This invention is specifically concerned with the isomerizing of normal butane to provide isobutane. The isobutane product of this invention may be utilized for various purposes, including alkylation reactions. The preferred alkylation reaction comprises combining isobutane with ethylene, propylene, butylenes, etc. to produce a mixture of higher isoparaffinic hydrocarbons boiling within the gasoline range and having a high octane number.

In most isomerization processes, catalytic agents are employed to effect the desired molecular rearrangement. Ordinarily, these catalytic agents consist of metal halides such as aluminum chloride, aluminum bromide, etc., which are activated by the addition of corresponding hydrogen halide. These catalytic materials are very active and effect very high conversions per pass. However, this high activity is disadvantageous in some respects. One of the greatest disadvantages is the fact that these catalytic materials not only accelerate the isomerization reaction, but also induce decomposition reactions. The latter are particularly detrimental to the economics of the operation in that they cause the loss of an appreciable portion of the charging stock as well as considerably increased catalyst consumption by the reaction of fragmental material with the catalytic agent to form sludge-like materials.

We have discovered a novel isomerization catalyst which can be effectively employed for the selective isomerization of normal butane without the attending decomposition reactions. Our novel isomerization catalyst comprises an alkali metal amide disposed on a promoted high surface area alumina support as hereinafter set forth. This novel isomerization catalyst when utilized in the isomerization of normal paraffins has been found to be applicable only to the selective isomerization of normal butane. This unexpected and rather unusual result is contrary to what would be theoretically expected and, in contradistinction to the prior art in the field of isomerization of normal paraffins, clearly demonstrates the novelty of the catalyst utilized in the present invention inasmuch as prior art isomerization catalysts utilized in the isomerization of normal paraffins generally teach the applicability of such isomerization catalysts to isomerizable organic compounds including paraffins containing 5 to 12 or more carbon atoms per molecule rather than to normal butane specifically. The catalyst utilized in the present process is not applicable to the isomerization of other normal paraffins. This selective isomerization catalyst is utilizable, as hereinbefore set forth, only for the isomerization of normal butane as will hereinafter be described and demonstrated in greater detail in the specification and examples.

It is therefore an object of this invention to provide a process for the isomerization of normal butane to isobutane utilizing a novel selective isomerization catalyst.

A specific object of this invention is to provide a novel method and a novel catalyst for selectively isomerizing normal butane to provide isobutane in high yields without the inducing of other decomposition reactions.

Taken in its broadest aspect, one embodiment of this invention resides in a process for the isomerization of normal butane which comprises contacting said normal butane at substantially anhydrous isomerization conditions with a catalyst comprising an alkali metal amide disposed on a promoted high surface area alumina support and recovering the resultant isobutane.

A further embodiment of this invention is found in a process for the isomerization of normal butane which comprises contacting said normal butane at substantially anhydrous isomerization conditions including a temperature in the range of from about 150° C. to about 300° C. and a pressure in the range of from about 5 to about 250 atmospheres with a catalyst comprising an alkali metal amide disposed on a promoted high surface area substantially anhydrous alumina support and recovering the resultant isobutane.

Yet another embodiment of this invention is found in a process for the isomerization of normal butane which comprises contacting said normal butane at substantially anhydrous isomerization conditions with a catalyst comprising potassium amide disposed on a promoted substantially anhydrous alumina having a surface area of from about 50 to about 500 square meters per gram and recovering the resultant isobutane.

Still another embodiment of this invention resides in an isomerization catalyst for the isomerization of normal butane comprising an alkali metal amide disposed on a promoted high surface area substantially anhydrous alumina support.

A specific embodiment of this invention resides in an isomerization catalyst for the isomerization of normal butane comprising potassium amide disposed on a substantially anhydrous gamma-alumina which has been impregnated with lithium hydroxide and thereafter calcined.

Other objects and embodiments referring to alternative alkali metal amides and promoted metal oxide supports will be found in the following further detailed description of this invention.

As hereinbefore set forth, the selective isomerization process of the present invention is effected in the presence of an alkali metal amide disposed on a promoted metal oxide support. The term "promoted," as used hereinbefore and hereinafter in the specification and also in the appended claims, will refer to a pretreatment of the metal oxide support with a salt or hydroxide of a metal selected from the group including alkali metals and alkaline earth metals such as lithium, sodium, potassium, rubidium, cesium, magnesium, calcium, strontium and barium. Of the alkali metal amides which are composited or disposed on the promoted metal oxide support, potassium and sodium are preferred inasmuch as said metals exhibit substantially more activity than do other metals of the alkinous metal group (i.e., the group comprising alkali metals and alkaline earth metals) and potassium is especially preferred for the same aforesaid reason. In addition to their high activity, these two metals are preferred from an economic standpoint inasmuch as said metals are relatively more plentiful and correspondingly less expensive to use.

In preparing such catalysts, the alkali metal amides are disposed on a support in a quantity ranging from about 2 to about 25% or more by weight based on the support. The preferred supports which are utilized in the process of the present invention are those which are relatively or substantially free from water. In most cases this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form. In addition to the necessity for freedom from water, the support is characterized by the necessity for having a high surface area. By the term "high surface area" is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the alkali metal amides in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. Likewise, alkali metal amide dispersions on sand or on other low surface area silica are not satisfactory catalysts in this process. In addition, aluminas which contain combined water but which have relatively high surface areas are also not satisfactory supports. Such aluminas include dried alumina monohydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of the catalysts for use in the process of this invention include high surface area crystalline alumina modifications such as gamma-, eta- and theta-alumina, although these are not necessarily of equivalent suitability. However, as is obvious from the above discussion, the limitation on the use of any particular support is one of freedom from combined or adsorbed water in combination with the surface area of the support selected. In addition to the aforementioned types of support, another type is that which is prepared from an alkali aluminate such as sodium aluminate, potassium aluminate, etc., from which a substantial majority of the alkali metal has been removed leaving only the alumina with a relatively minor amount of the alkali metal present.

The desired support, preferably, although not necessarily gamma-, eta- or theta-alumina is pretreated with a promoter in any manner. One method of impregnating the solid support is to treat said support with an alkali metal hydroxide such as lithium hydroxide, potassum hydroxide, sodium hydroxide, etc., and thereafter calcined at a temperature, usually in the range of from about 500° to about 700° C. whereby said hydroxide is thoroughly dehydrated.

The novel catalyst of the present invention is then prepared by dissolving an alkali metal such as potassium in liquid ammonia and impregnating the promoted alumina with an ammonia solution of potassium amide, the potassium amide having been formed when the potassium reacted with the ammonia. Following this impregnation by the alkali metal amide in the ammonia the excess ammonia is driven off and the catalyst is then ready for use in the desired selective isomerization reaction. Examples of alkali metal amides which may be utilized include potassium amide, sodamide, lithium amide, rubidium amide, cesium amide, the preferred amides comprising sodamide and potassium amide due to the relatively large amount of these metals available and the correspondingly lower cost of the same.

The process of the present invention may be effected in any suitable manner and may comprise either a batch or continuous type operation. One example of a batch type operation which may be employed in the isomerization of normal butane is when an appropriate apparatus such as a condensation flask or, if higher temperatures and pressures are to be used, a rotating autoclave is selected to contain the isomerization catalyst of the type hereinbefore set forth. The apparatus and contents thereof are then heated to the desired reaction temperature and maintained thereat for a predetermined period of time. If higher than self-generated pressures are to be used, an inert gas such as nitrogen, that has been pre-dried by such as, for example, treatment over high surface sodium, may be pressured into the system until the desired pressure has been reached. At the end of the reaction period, the desired isobutane product is separated from the catalyst and recovered by conventional means.

The process of this invention may also be effected in a continuous type operation, the catalyst comprising an alkali metal amide disposed on a promoted metal oxide support being particularly suitable for use in a fixed bed type of operation. The actual operation of the process may be either upflow or downflow. When the continuous fixed bed type of operation is used, the catalyst is disposed as a fixed bed in a reaction zone maintained at the proper operating conditions while the normal butane is continuously charged thereto. In carrying out the process of this invention in a continuous manner, liquid hourly space velocities (the volume of liquid hydrocarbon charged to the reactor per volume of catalyst per hour) may be varied within a relatively wide range of from about 0.1 to about 20 or more, the preferred range being from about 0.1 to about 10. The desired isobutane product is continuously withdrawn from the reaction zone, separated from the reactor effluent and purified by conventional means, if necessary, while said remaining effluent may be recharged at least in part to the reaction zone as a portion of the feed material.

Other continuous types of operation which may be used in this process include the compact moving bed type of operation in which the bed of catalyst and the reactant pass either concurrently or countercurrently to each other in the reaction zone, and the slurry type operation in which the catalyst is carried into the reaction zone as a slurry in the charge to the reactor.

The process of this invention is preferably effected at elevated temperatures and pressures. The isomerization reaction zone should be maintained at substantially anhydrous conditions. The term "substantially anhydrous" as used hereinbefore and hereinafter in the specification and appended claims, by way of definition and for the purpose of illustration only with no intention of unduly limiting the generally broad scope of this invention, includes that quantity of water having a concentration of less than 0.01 weight percent, and preferably, less than 0.005 weight percent, based on total feed to the isomerization zone. The selective isomerization will be carried out at temperatures in the range of from about 150° C. to about 300° C. or more. The pressure at which this process operates ranges from about 5 to about 250 atmospheres or more, the pressure employed being sufficient to maintain a substantial portion of the normal butane charge in the liquid phase.

It is particularly preferred that the charge stock to our process be predominantly normal butane. However, it is also contemplated within the scope of the present invention that the normal butane may be selectively isomerized from a fluid mixture of normal paraffins which may be present as a refinery product, recycle and/or off-gas stream inasmuch as the catalyst of the present process will not isomerize normal paraffins other than normal butane. In addition, the process of the present invention is applicable to charge stocks where the concentration of normal butane may be very low such as, for example, 5% or lower. In such normal butane-containing charge stocks the balance of the charge stock usually comprises olefins such as ethylene, propylene, the butenes, the pentenes, etc. in concentrations of less than about 50% by weight of the charge stock with the balance of the charge stock being higher molecular weight normal paraffins such as normal pentane, normal hexane, normal heptane and/or higher molecular weight isoparaffins such as isooctane, etc. However, it is preferred, for economic reasons, that the normal butane concentration be at least 30% by weight of the charge stock and still more preferalby, in amounts of at least 50% by weight of the charge stock.

The following examples are given to illustrate our invention but are not introduced with the purpose of unduly limiting the same.

*Example I*

A selective isomerization catalyst was prepared in the following manner. Approximately 200 cc. of halide-free high surface area alumina spheres were treated with a lithium hydroxide solution equal to 0.5 weight percent of the alumina. The lithiated or promoted metal oxide support was then dried in a rotary steam dryer and calcined for 3 hours at 550° C. and then stored in a desiccator.

Following this, 100 cc. of the promoted metal oxide support was withdrawn from the desiccator, calcined 1 hour at 550° C. and then placed, hot, into a 300 ml. rotating flask under high surface sodium-dried nitrogen flow. The balance of the promoted metal oxide support was utilized in preparing catalyst "B" as hereinafter set forth in Example II. Potassium metal was added in two increments to the flask. The flask was heated after the first increment was added to the flask until the potassium metal started to melt, the maximum temperature during the reaction rising to approximately 98° C. When the reaction was complete, the flask was allowed to cool. The second increment of potassium metal was then added to the flask. The flask was again heated until the potassium metal began to melt and the maximum temperature during the reaction rose to about 88° C. When the reaction was complete, the flask was allowed to cool to about 32° C. and ammonia gas was added to the flask and contents thereof. The temperature of the fisk once again rose, and ammonia gas was added to the flask for a total of 1 hour. The catalyst was determined to have a medium gray color after the gaseous ammonia treatment. The catalyst was then flushed with high surface sodium-dried nitrogen. After nitrogen flushing, about 10% of the catalyst was found to be a medium gray color and the balance was a light gray color. A catalyst sample was carefully taken. The catalyst was then transferred to a 100 cc. vial and sealed. The catalyst was analyzed and it was determined that there was 20.1 weight percent potassium in the catalyst. This catalyst was designated as catalyst "A."

*Example II*

A second selective isomerization catalyst was prepared in the following manner. Approximately 300 ml. of ammonia gas was condensed in a 500 ml., 3-necked flask immersed in a Dry Ice-trichloro-ethylene bath. The flask was equipped with a glass T stoppered at the top to permit the addition of potassium to the flask. A side arm of the T was connected to a high surface sodium-dried nitrogen source for continued purging during the entire preparation. Another neck of the flask was equipped with an upright condenser to prevent the ammonia gas from escaping. The center neck was equipped with a stainless steel moon-shaped stirrer.

The flask was then flushed with the high surface sodium-dried nitrogen and 0.2 gram of calcined ferric oxide was added as a promoter. With stirring at approximately the reflux temperature of ammonia, potassium metal was added, a piece at a time, waiting between additions for the intense blue color of potassium in ammonia to change to a dark gray color indicating the formation of potassium amide. When the reaction was complete, the flask was cooled and 100 cc. of halide-free promoted high surface area alumina was added. This alumina had been previously promoted with lithium hydroxide solution equal to 0.5 weight percent of the alumina, then dried in a rotary steam drier, calcined for 3 hours at 550° C. and then stored in a desiccator as set forth in Example I. After the lithiated or promoted alumina was impregnated with potassium amide, the cooling bath was removed from the flask and the mixture stirred until all the excess ammonia was removed by evaporation. Following the evaporation of the ammonia, the catalyst was then flushed with high surface sodium-dried nitrogen and added to a reactor under high surface sodium-dried nitrogen flow. A catalyst sample was carefully taken and analyzed and it was determined that there was 20.6 weight percent potassium in the catalyst. This catalyst was designated as catalyst "B."

*Example III*

A third catalyst was prepared by the method as set forth in Example I so that another 100 cc. of catalyst was produced. This catalyst was found to be essentially the same as catalyst "A." This catalyst was designated as catalyst "C."

*Example IV*

The catalyst prepared according to Example I above and designated as catalyst "A" was loaded into a reactor under a nitrogen flow and sealed. The system was then pressured with dried nitrogen to a pressure of about 800 p.s.i.g. A substantially anhydrous charge stock comprising a mixture of 50% propylene—50% normal butane containing less than 0.001 weight percent water was pumped to the reactor. The selective isomerization of normal butane was effected at a temperature ranging from about 150° to about 190° C. The effluent from the reactor was passed into a fractionating column and into a conventional separation system.

After a sufficient plant lineout, 10 hour test period analyses indicated that 21.3 weight percent of isobutane was produced based on normal butane charged to the reactor. The product was analyzed using gas-liquid chromatography.

*Example V*

The catalyst prepared according to Example II and designated as catalyst "B" had been loaded into the reactor under high surface sodium-dried nitrogen flow as hereinbefore set forth in Example II. The system was then pressured with dried nitrogen to a pressure of 800 p.s.i.g. Once again, the substantially anhydrous charge stock comprising a mixture of 50% propylene—50% normal butane containing less than 0.001 weight percent water was charged to the reactor. The selective isomerization of normal butane was effected at a temperature ranging from about 170° to about 195° C.

After a sufficient lineout of the plant, a 10 hour test period was initiated and it was found by gas-liquid chromatography that 11.2 weight percent of isobutane was produced based on normal butane charged to the reactor.

Example VI

The catalyst prepared according to the method of Example I and designated in Example III as catalyst "C" was loaded into a reactor under a dried nitrogen flow and sealed. The system was then pressured with nitrogen following which a substantially anhydrous charge stock comprising a mixture of 50% propylene—50% normal heptane containing less than 0.001 weight percent water was charged to the reactor. The plant was maintained at a pressure of about 2000 p.s.i.g. The reaction products were withdrawn and passed to the fractionation and separation zones and the products were analyzed using gas-liquid chromatography. The isomerization catalyst did not effect the isomerization of the normal heptane as evidenced by results obtained from the gas-liquid chromatographic analyses.

Example VII

Still another 200 cc. of catalyst was prepared according to the method as set forth in Example II. Half the catalyst prepared was utilized at isomerization conditions in an attempt to isomerize normal pentane from a substantially anhydrous, normal pentane-propylene mixture containing less than 0.001 weight percent water, and the catalyst did not do so as evidenced by gas-liquid chromatographic analyses of the reaction products. The second portion of this catalyst that had been prepared was utilized at isomerization conditions in an attempt to isomerize normal hexane in a substantially anhydrous, normal hexane-propylene mixture containing less than 0.001 weight percent water. This was also unsuccessful.

We claim as our invention:

1. A process for the production of isobutane which comprises isomerizing normal butane at substantially anhydrous isomerization conditions in contact with a catalyst comprising an alkali metal amide disposed on a high surface area alumina support which has been promoted with a hydroxide of a metal selected from the group consisting of the alkali metals and alkaline earth metals and calcined, and recovering the resultant isobutane.

2. A process for the production of isobutane which comprises isomerizing normal butane at substantially anhydrous isomerization conditions in contact with a catalyst comprising an alkali metal amide disposed on a high surface area substantially anhydrous alumina support which has been promoted with an alkali metal hydroxide and calcined, and recovering the resultant isobutane.

3. A process for the production of isobutane which comprises isomerizing normal butane at substantially anhydrous isomerization conditions including a temperature in the range of from about 150° C. to about 300° C. and a pressure in the range of from about 5 to about 250 atmospheres in contact with a catalyst comprising an alkali metal amide disposed on a high surface area substantially anhydrous alumina support which has been promoted with a hydroxide of a metal selected from the group consisting of the alkali metals and alkaline earth metals and calcined, and recovering the resultant isobutane.

4. A process for the production of isobutane which comprises isomerizing normal butane at substantially anhydrous isomerization conditions in contact with a catalyst comprising an alkali metal amide disposed on a substantially anhydrous alumina having a surface area of from about 50 to about 500 square meters per gram and which has been promoted with a hydroxide of a metal selected from the group consisting of the alkali metals and alkaline earth metals and calcined, and recovering the resultant isobutane.

5. A process for the production of isobutane which comprises isomerizing normal butane at substantially anhydrous isomerization conditions in contact with a catalyst comprising potassium amide disposed on a substantially anhydrous alumina having a surface area of from about 50 to about 500 square meters per gram and which has been promoted with a hydroxide of a metal selected from the group consisting of the alkali metals and alkaline earth metals and calcined, and recovering the resultant isobutane.

6. A process for the production of isobutane which comprises isomerizing normal butane at substantially anhydrous isomerization conditions in contact with a catalyst comprising potassium amide disposed on a gamma-alumina support which has been promoted with a hydroxide of a metal selected from the group consisting of the alkali metals and alkaline earth metals and calcined, and recovering the resultant isobutane.

7. Process of claim 2 in which said hydroxide is lithium hydroxide.

References Cited in the file of this patent

UNITED STATES PATENTS

| | | |
|---|---|---|
| 1,159,365 | De John | Nov. 9, 1915 |
| 1,605,875 | Urfer | Nov. 2, 1926 |
| 1,737,953 | Urfer | Dec. 3, 1929 |
| 2,881,234 | Esmay et al. | Apr. 7, 1959 |